No. 846,578. PATENTED MAR. 12, 1907.
H. D. LAUGHLIN.
SIDE BEARING FOR CARS.
APPLICATION FILED DEC. 18, 1906.
3 SHEETS—SHEET 1.
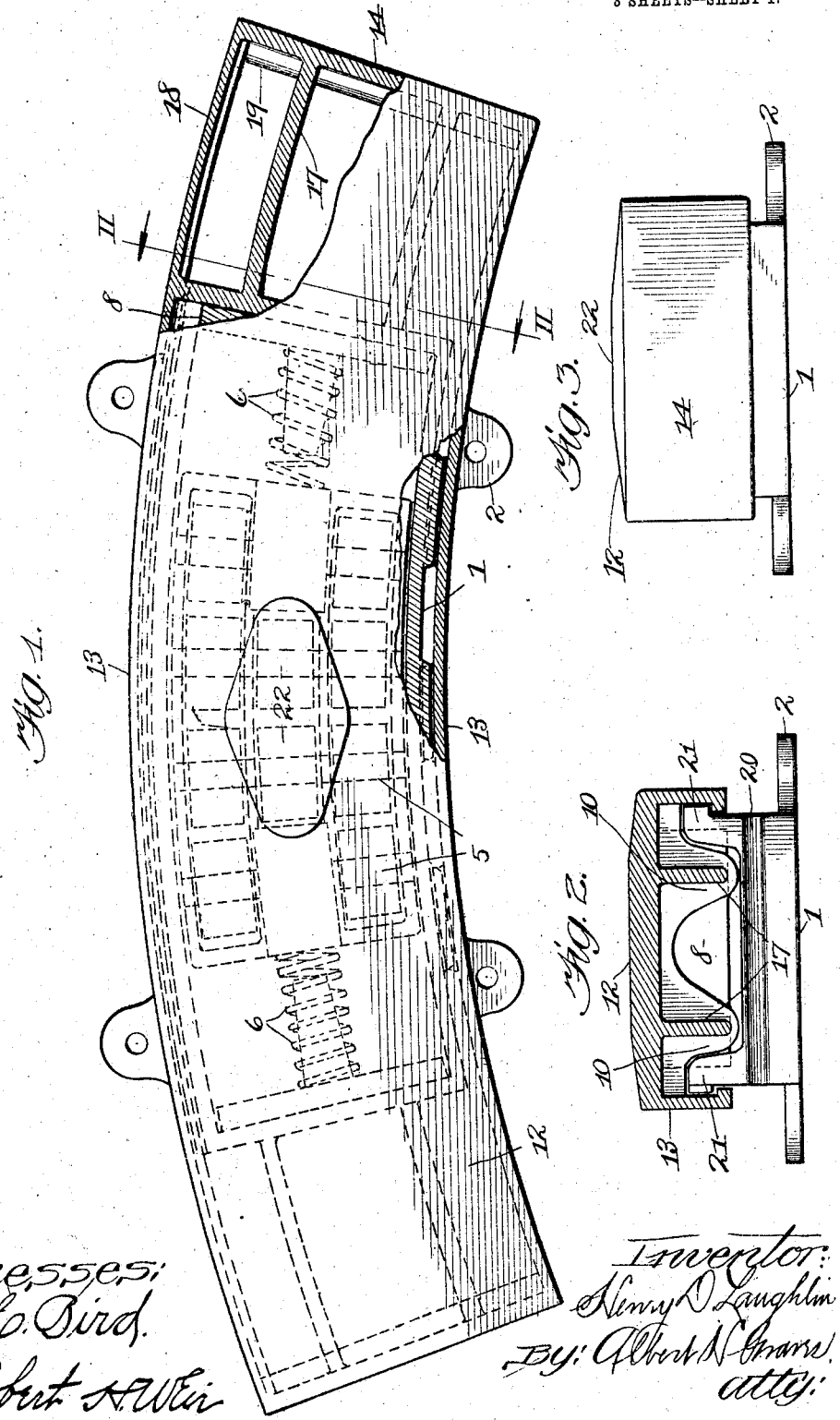

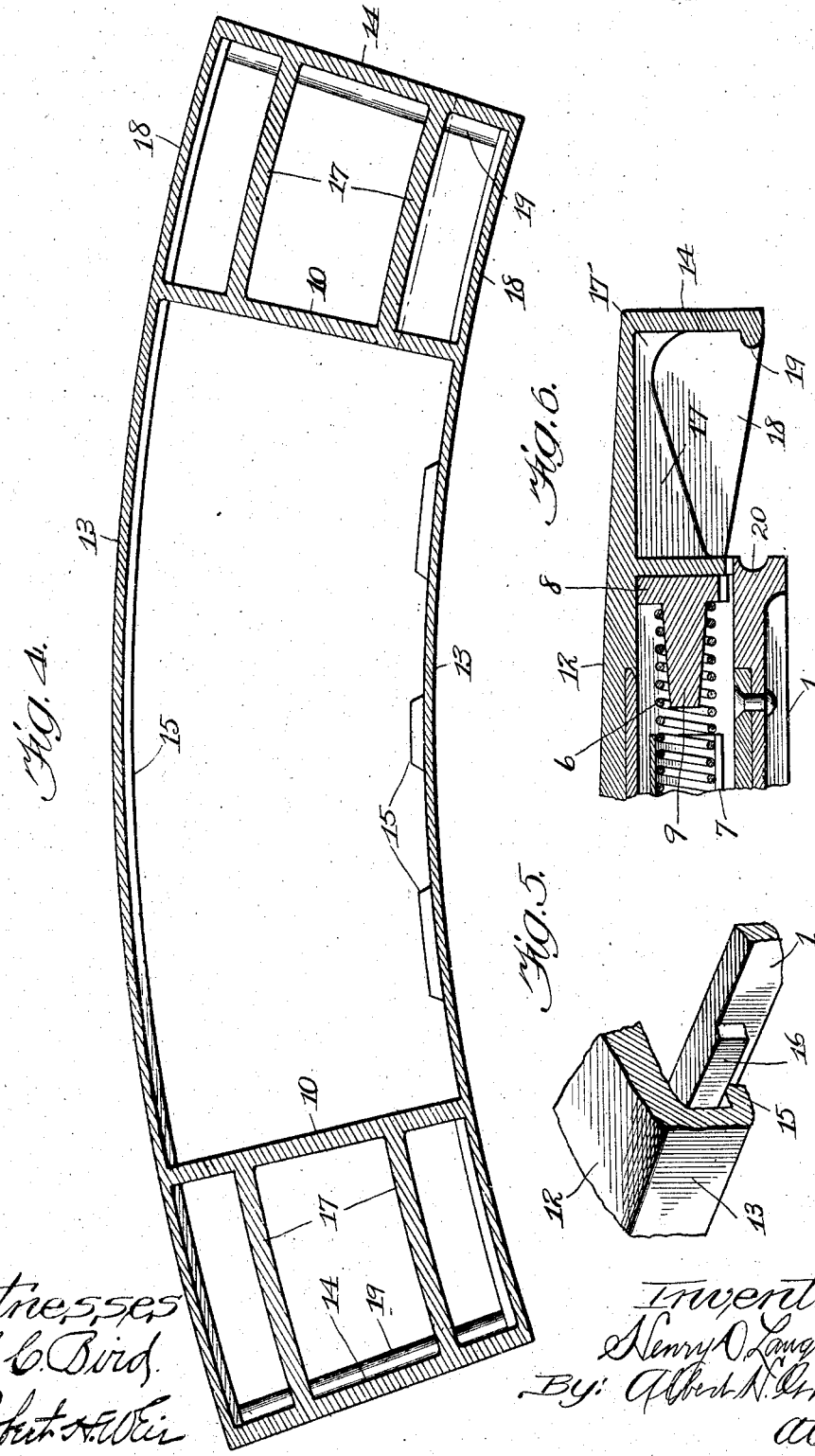

No. 846,578. PATENTED MAR. 12, 1907.
H. D. LAUGHLIN.
SIDE BEARING FOR CARS.
APPLICATION FILED DEC. 18, 1906.

3 SHEETS—SHEET 3.

UNITED STATES PATENT OFFICE.

HENRY D. LAUGHLIN, OF CHICAGO, ILLINOIS.

SIDE BEARING FOR CARS.

No. 846,578.   Specification of Letters Patent.   Patented March 12, 1907.

Application filed December 18, 1906. Serial No. 348,411.

*To all whom it may concern:*

Be it known that I, HENRY D. LAUGHLIN, a citizen of the United States, residing at Chicago, Illinois, have invented certain new and useful Improvements in Side Bearings for Cars, of which the following is a specification.

This invention relates to improvements in antifriction side bearings, and has special reference to side bearings of the general construction covered by my prior patent, No. 722,995, of March 17, 1903, wherein the top bearing member is mounted to traverse the base member and is of substantially the same length as said base member. In side bearings of that type when the top member is moved to other than central position a portion of the interior of the bearing is uncovered and exposed, permitting the entrance of dust and sometimes of solid bodies which clog the bearing and interfere with its freedom of movement or cause breakage. Said bearings are provided with centering-springs and coöperating parts which cannot in practice be made very heavy. The construction is such that at times said springs are violently and solidly compressed by shifting of the top bearing member, and the concussion breaks one or more of the weaker parts.

The chief objects of this invention are to provide a side bearing whereof the interior shall always be covered by the top member in any and all positions of the latter; to provide a side bearing so constructed and also having means for effectively resisting certain strains, as hereinafter described; to provide in a side bearing of the above construction special means for stopping the travel of the top member before the springs have been fully compressed, and in general to improve the structure of side bearings.

To these ends my invention consists in the matters hereinafter described, and particularly pointed out in the appended claims, and will be more readily understood by reference to the accompanying drawings, in which—

Figure 7:
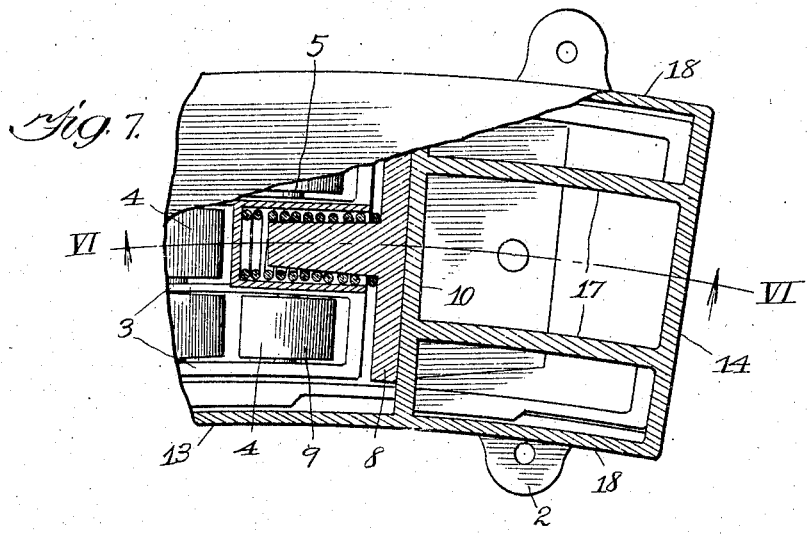
Figure 8:
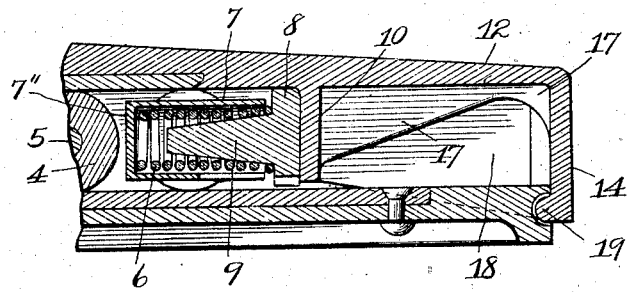
Figure 9:
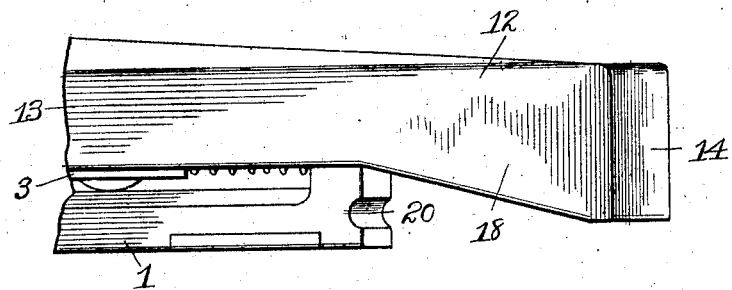

Figure 1 is a top plan view of a side bearing embodying a preferred construction, showing certain interior parts in dotted lines, part of the figure being shown in section. Fig. 2 is a transverse section taken on line II II of Fig. 1. Fig. 3 is an end elevation of the bearing. Fig. 4 is a horizontal sectional view of the top bearing member detached. Fig. 5 is a detail view of retaining-flanges at one side of the bearing. Fig. 6 is a longitudinal vertical section taken on line VI VI of Fig. 7, the top plate being in normal centered position. Fig. 7 is a horizontal sectional view showing the top bearing member in extreme position. Fig. 8 is a vertical sectional view similar to Fig. 6 and showing the parts in the same position as in Fig. 7. Fig. 9 is a side elevation of one end of the top plate at normal position.

The general construction of this bearing is like that shown and described in my said prior patent and will not, therefore, be minutely described.

In the drawings, 1 designates, as a whole, a box-like base member provided with suitable lugs 2 2, whereby it may be bolted to the top of a truck-bolster, said base member having the form of an open-topped oblong and approximately rectangular box, curved, however, throughout its length to conform to the arc of oscillation of that part of the bolster on which it is mounted. Within said base member is arranged a roller-carriage 3, constructed to receive a plurality of longitudinal series of roller elements 4, the two outer series each comprising, preferably, four rollers, while the intermediate series contains two rollers only. The rollers are mounted on shafts 5, mounted in the carriage 3 and extending radially with respect to the center bearing (not shown) of the truck, and in order that the carriage may travel naturally in the curved path described the several rollers are made slightly tapering.

The carriage and the top bearing member are automatically centered with respect to the bearing-base 1 by means of two expansion or compression springs 6, arranged near the respective ends of the bearing, as shown. To receive the springs, sockets 7, having ends 7″, are cast in the ends of the carriage 3. Loosely arranged within the top bearing member 12 are two abutment-plates 8, provided with cylindric lugs 9, fitting loosely within said springs. Said plates 8 are freely movable between the side walls of the base member 1, and in order that they shall be actuated (one at a time) by the top member 12 the latter is provided with two sets of depending lugs 10, which overlap the outer surfaces of the respective plates 8.

The top bearing member, which is movable independently of the abutment-plates 8, is box-like in form, it comprising the horizontal plate portion 12, the depending overhanging sides 13, and the depending end walls 14. As indicated in Fig. 1, this bearing member is made substantially longer than the base portion of the bearing, so that when in its normal position both ends of the former overhang the ends of the latter. The purpose of this excess length of the top member is twofold: to provide stops at the ends of this member for stopping it before the springs 6 have become solidly compressed by the movement of said member upon the base of the bearing; secondly, to provide interlocking strain-resisting parts, as hereinafter described. In the absence of the stops referred to above the centering-springs would at times be fully or solidly compressed, and would transmit heavy blows to the end walls of their sockets, while the lugs 10 would be equally stressed and breakage of some of said parts would result.

The end walls of the base portion of the bearing-box 1 are provided with upstanding lugs 21, which serve to arrest and limit the motion of the abutment-plates 8 when the top bearing member is shifted and also tend to arrest both the carriage and the top member when these parts assume their central positions.

The bearing members 1 and 12 are shown as provided with coengaging retaining-flanges 15 16, which prevent dislocation when the parts are in other than centered position. The top member 12 is provided centrally with an elevated, preferably flattened, upper surface 22 of limited area, which serves to distribute the weight more evenly among the rollers, as described in my prior patent.

The travel of the top bearing member upon its base is limited in both directions by suitable stops, which in the present instance are formed by the lower portions of the depending end walls 14 of said member striking the ends of the base member 1. I prefer that the ends of the top member and of the base be provided with interfitting parts adapted to interlock when the former is at either end of its travel in order that when the overhanging end of the bearing is subjected to greater downward pressure than its supported portion the coengagement of said interfitting parts shall bind or brace the overhanging end, thereby relieving the retaining-flanges 15 16 of a large percentage of the stress tending to break them. As shown, the lower edge of the end wall 14 is formed with an internal transverse rib, flange, or hook 19, and for the reception thereof the end of the base member 1 is provided with a transverse groove 20. This construction is the same at both ends of the bearing. The operation will be obvious from the foregoing explanation of the purpose of the construction. When the end of the top member that is opposite the end shown in Fig. 8 is pressed or struck downwardly by the car body or bolster or otherwise, the tendency will be to lift the opposite end—i. e., that shown in Fig. 8. In the absence of the device, as 19 20, the retaining-flanges 15 16 would receive the brunt of the stress and would in all probability be fractured; but such condition is obviated by the interlocking engagement of the projection 19 with the recess in the end of the base, which, it is to be noted, is at the farthest possible distance from the overhanging end of the top member, and hence exerts the greatest leverage, so to say, upon the top member as a unit. The end walls 14, which forcibly strike the base of the bearing at times, must be properly reinforced against both downward and horizontal thrusts. To this end I prefer to construct the end portions of the top bearing member as follows: The end wall 14 is braced and connected to the depending lugs 10 by a plurality of webs, as 17 17 and 18 18, the webs 18 being practically extensions of the side walls 13 and their lower edges inclining downwardly and outwardly to meet the lower corners of the member 12. The other webs 17 spring from the lower portions of the respective lugs 10 and are undercut along a line extending obliquely upward and almost meeting the top plate 12, but merging into the filleted end portions 17'. In other words, these intermediate webs decrease in depth from the lugs 10 outwardly to the end wall 14. The preceding description applies to both ends of the bearing member. It will be evident that this or any equivalent suitable construction of the top bearing member will endow the same with sufficient strength and rigidity to withstand the shocks to which it will be subjected in service. I will state in this connection that the end stops carried by this member need not necessarily be made in rectangular or plate form, and I do not so limit their construction.

In regard to the general operation of the bearing it may be explained that whenever the top bearing member is shifted one of its pairs of lugs 10 will draw in the adjacent abutment-plate 8, thereby compressing one of the springs, while the movement imparted to the carriage 3 at the same time compresses the other spring, the outer end of which will be held against movement by its abutment 8 and the contacting pair or stop-lugs 10. If the disturbing force continues to shift the top member, one of its stop devices 19 will strike the end of the base, and this will occur before the springs have been compressed to such extent that they would entirely close with their turns in contact. This is the protective action of the end stops upon the carriage. The protection of the retaining-flanges has already been described. When the displacing pressure has been removed, the springs restore the parts to normal positions.

The outer bearing members together constitute a housing which is as nearly dustproof as is practicable, the clearance between said parts being quite small, as shown in Fig. 2 of the drawings.

I claim as my invention—

1. In a side bearing for cars, a fixed base member, a longitudinally-movable top bearing member, an interposed antifriction device, said top member having normally extended or overhanging ends, stops carried by and preferably integral with said ends, said stops being positioned to strike the ends of the base member for limiting the travel of the top bearing member, and webs for strengthening the overhanging portions of said top member.

2. In a side bearing for cars, a fixed base member, a longitudinally-movable top bearing member, an interposed antifriction device, said top member having normally extended or overhanging ends, centering-springs compressible by shifting of the top bearing member, stops carried by the ends of said top bearing member, said stops being positioned to strike the ends of the base member before the extreme possible compression of said springs, and webs for strengthening the overhanging portions of the top bearing member.

3. In a side bearing for cars, a fixed base member, an antifriction device held within said base member, a movable top member mounted upon said antifriction device, said top member being provided at its ends with longitudinally-overhanging extensions, depending end walls carried by said extensions and one or more longitudinal vertical webs strengthening said extensions, said end walls forming stops adapted to strike the ends of the base member for limiting the travel of the top bearing member.

4. In a side bearing for cars, a fixed base member, a longitudinally-movable top bearing member, an interposed antifriction device, said top member being provided at its ends with longitudinally-overhanging extensions, integral, depending end walls upon said extensions, lugs depending from said top member in substantial register with the ends of the base member, and vertically-disposed webs connecting said lugs with the adjacent end walls, the latter forming stops adapted to limit the travel of the top bearing member.

5. In a side bearing for cars, a top bearing member comprising a horizontal bearing portion, depending lugs for engaging centering devices, end portions extending beyond said lugs, stop walls at the ends of said end portions, webs forming the sides of said end portions, and intermediate webs connecting said lugs to said stop-walls.

6. In a side bearing for cars, a base member and a top member mounted for longitudinal movement upon the base member, said top member having normally overhanging ends, said overhanging ends and the base member being provided with interfitting parts adapted to interlock when in contact with one another, for the purpose described.

7. In a side bearing for cars, a base member and a top member mounted for longitudinal movement upon the base member, the ends of said top member extending beyond those of the base member, stops carried by the ends of the top member, said stops and the ends of the base member being formed to interlock when in contact with one another, for the purpose described.

8. In a side bearing for cars, a base member and a top member mounted for longitudinal travel upon the base member, said top member having normally overhanging end portions depending stops carried by said end portions, said stops each being provided with an inward projection, and each end of the base member being formed with an undercut recess adapted to receive the inward projection of the adjacent end of the top bearing member, for the purpose described.

9. In a side bearing for cars, a base member, an antifriction device mounted to traverse said base member, a top member mounted for longitudinal movement upon said antifriction device, the ends of said top member extending normally beyond those of the base member, and means for arresting the movement of the top member within limits of travel not greater than the length of the extension thereof beyond the base member, whereby the interior of the bearing is at all times maintained covered.

HENRY D. LAUGHLIN.

Witnesses:
ALBERT H. GRAVES,
K. M. IMBODEN.